US005672303A

United States Patent [19]

Metzger et al.

[11] Patent Number: 5,672,303
[45] Date of Patent: Sep. 30, 1997

[54] PROCESS AND EXTRUDING HEAD FOR THE MANUFACTURE AND/OR COATING OF EXTRUDING PROFILES

[75] Inventors: Burkhard Metzger; Hans Joachim Ziolkowski, both of Ingelheim, Germany

[73] Assignee: Bellaform Extrusionstechnik GmbH, Ingelheim, Germany

[21] Appl. No.: 528,802

[22] Filed: Sep. 15, 1995

Related U.S. Application Data

[63] Continuation of Ser. No. 244,939, filed as PCT/EP93/02816, Oct. 13, 1993, published as WO94/08774, Apr. 28, 1994, abandoned.

[30] Foreign Application Priority Data

Oct. 17, 1992 [DE] Germany .................. 42 35 101.4

[51] Int. Cl.⁶ .......................... B29C 47/02; B29C 47/28
[52] U.S. Cl. ................. 264/75; 264/171.17; 264/173.18; 264/245; 425/113; 425/114; 425/131.1; 425/133.1; 425/462
[58] Field of Search ................. 264/75, 245, 173.18, 264/171.17; 425/113, 114, 131.1, 133.1, 462, 516, 382.3

[56] References Cited

U.S. PATENT DOCUMENTS

| | | | |
|---|---|---|---|
| 2,403,398 | 10/1946 | Johnson | 425/131.1 |
| 2,779,970 | 2/1957 | Stöcker | 425/113 |
| 2,820,249 | 1/1958 | Colombo | 425/462 |
| 2,879,544 | 3/1959 | Fleck | 425/133.1 |
| 3,343,215 | 9/1967 | Vinkeloe | 425/467 |
| 3,495,300 | 2/1970 | Meitinger | 264/174 |
| 3,780,154 | 12/1973 | Müller et al. | 264/174 |
| 4,248,824 | 2/1981 | Hattop | 264/245 |
| 4,756,682 | 7/1988 | Blaise | 425/113 |
| 4,998,870 | 3/1991 | Seibert | 264/245 |

FOREIGN PATENT DOCUMENTS

| | | |
|---|---|---|
| 0419983 | 9/1990 | European Pat. Off. |
| 2308490 | 11/1976 | France . |
| 1927405 | 4/1964 | Germany . |
| 1963161 | 6/1971 | Germany . |
| 2030578 | 12/1971 | Germany . |
| 2835139 | 3/1979 | Germany . |
| 30831 | 3/1952 | Luxembourg . |
| WO9011880 | 10/1990 | WIPO . |

OTHER PUBLICATIONS

Dr. Gerhard Schenkel, "Kunststoffextruder Technik" [Plastic Extruder Technology], 1963, pp. 479–491.
Henson, Knappe and Potente, "Handbuch der Kunststoffextrusionstechnik", vol. I, pp. 375–385, vol. II pp. 20–26.
Correspondence from Walther Junius, Patent Attorney regarding Paul Troester Opposition, dated Nov. 28, 1995.
Extract of Japanese Patent Publication No. JP5–8045038 dated Mar. 16, 1983.
Extract of Japanese Patent Publication No. JP54–105157 dated Sep. 1979.

*Primary Examiner*—Jeffery R. Thurlow
*Attorney, Agent, or Firm*—Michael D. Bednarek; Kilpatrick Stockton LLP

[57] ABSTRACT

For the extrusion of extruded profiles with a color pattern or their coating with such a color pattern, a plasticized material of at least two-colors is used, which is separated into at least two partial flows. These partial flows are combined before they exit the extruding head (1), whereby the partial flows are largely maintained. These partial flows can in turn be separated into further partial flows. The extruding head (1) is equipped with a distribution plate (4) in which distribution channels (8a, b) as well as a ring channel (11) are formed as grooves, with the ring channel connected to an the exit channel (38) through a ring slot (19, 20). The plasticized material entering through the ring slot (19, 20) into the exit channel (38) coats the pre-manufactured extruded profile (39) inserted through the guidance part (13) and the die arbor (24).

26 Claims, 5 Drawing Sheets

PROCESS AND EXTRUDING HEAD FOR THE MANUFACTURE AND/OR COATING OF EXTRUDING PROFILES

This application is a continuation of Ser. No. 08/244,939 filed Jun. 15, 1994 now abandoned.

FIELD OF THE INVENTION

The invention deals with a process for the continuous extrusion and/or coating of extruded profiles, whereby a plasticized material is fed to an extruding head and extruded through the same. The invention also deals with an extruding head for the manufacture and/or coating of extruded profiles with a feeder channel for feeding plasticized material from a plasticizing and conveyor device and with an exit channel connected to the feeder channel.

BACKGROUND OF THE INVENTION

In the case of polymer pencils, particularly those with lead which is coated with materials containing polymers, it is desired to imitate the wood grain of common pencils with a suitable color pattern. With the existing production methods, only pencil lead coatings of homogenous colors could be produced or color patterns which are not comparable to wood grain.

From DE-OS 20 30 578, an extruding head is known, the extrusion die of which is surrounded by a ring channel, which is connected to the plasticizing device by a feeder channel on one hand and exits into a ring slot pointing in the direction against the exit direction of the extrusion die on the other hand, whereby the ring slot leads around a deflection edge at the input end of the extrusion die and ends in the die channel. With this known extruding head, extruded profiles can be manufactured or coated.

However, a pattern cannot be produced on the extruded profiles or coating with this extruding head.

From DE-GM 19 27 405 a deflection extruding head is known, which is mainly used for the production of tubing and tubular film, but also for cable coating. The intent is to evenly distribute the pressure, temperature, viscosity and speed values to the entire circumference of the ring die. Of the partial flows, two flows respectively, are combined in the deflection extruding head, which are then combined with the thus formed partial flows in the exit channel. Due to the acute angle of the channels for the partial flows, i.e. the design of the flow isles, the partial flows cross, which leads to an intense blending of these partial flows. This is supported through a widening of the chamber in direction of the exit opening behind the point where the partial flows are combined. Such a deflection extruding head is not suitable for the production of a pattern, since a complete blending of the partial flows occurs.

From DE-OS 19 63 161, a process is known for the production of objects made of thermoplastic plastics with a consistency similar to wood grain. For the production of a pattern it is essential that the pigment content of the color granules is significantly higher than that of the basic mixture.

SUMMARY OF THE INVENTION

The task of the invention is a process and an extruding head for the manufacture and/or coating of extruded profiles, whereby the extruded profile and/or the coating shall be of a color pattern which in particular, shall resemble that of the grain of wood.

This task is solved with a process according to the claimed invention.

A plasticized material of at least two colors is used as material for the production of the extruded profile and/or the coating. A dual or multi-colored material can be produced, for instance, by adding several colors to the plasticized material without performing a homogenous blending. After the production of the plasticized material of at least two colors, this material is divided into at least two partial flows and these partial flows are then subsequently combined again before they exit the extruding head, whereby the partial flows are largely maintained. In this manner extruded profiles and/or coatings of extruded profiles can be produced which, in a cone shaped cut of sharpened pencils, for example, show curved color patterns which are comparable to that of the grain of wood. It was discovered that a correlation exists between the number of curved patterns and the number of partial flows, so that the pattern of the imitated wood grain can be adjusted through the number of partial flows.

In order to obtain the finest possible pattern, the respective partial flows can in turn be separated into additional partial flows, which are subsequently combined again before they exit the extruding head, whereby these partial flows are largely maintained. When combining the partial flows, one has to ensure that a homogenous blending of the partial flows is avoided since the above-mentioned curved patterns can otherwise not be obtained in the desired way.

In order to obtain a largely symmetric pattern, it is advantageous to separate the plasticized material into equal-sized partial flows.

According to a special design, the partial flows are combined in one direction vertically to the exit direction of the extruding head and subsequently jointly deflected into the exit direction. The chamber in which the partial flows are first combined is preferably a ring chamber.

A specially equipped extruding head is required for the performance of this process, which has at least one feeder channel through which plasticized material is fed from a plasticizing and conveyor device to an extruder, for example. Between the feeder channel and the exit channel of the extruding head, at least two distribution channels exist according to the invention, which lead into a collector channel, preferably a ring channel in equidistant locations, which in turn is connected to the exit channel with a ring slot. The number of distribution channels, whereby the distribution channels can also lead into sub-distribution channels, depends on the type of the desired color pattern of the extruded profile and/or the coating of the extruded profile. Each sub-distribution channel can thus in turn also be separated into at least two additional sub-distribution channels, so that any choice of fine pattern can be obtained.

In order to obtain the shortest possible length of the extruding head, it has proved to be advantageous if the distribution channels lead into the ring channel in radial direction, whereby the preferred arrangement of the ring channel is vertical to the longitudinal axis of the exit channel. In order to obtain a regular pattern along the circumference of the extruded profile and/or coating, it is advantageous to have the distribution channels enter into the ring channel at equidistant locations.

The cross-sections of the distribution channels should preferably be of the same size.

Depending on whether an extruded profile or the coating of a pre-manufactured extruded profile or a multiple coating are to be produced, the location of the ring channel is to be suitably adjusted in the extruding head. If a pre-manufactured extruded profile is inserted into the extruding head, the ring channel is installed so that it surrounds the pre-manufactured extruded profile. In this case the ring channel is preferably installed in the direction of the exit in front of the die of the extruding head. If, for example, two coats are to be applied simultaneously to an extruded profile, the ring channel can be installed in the extruding head in the exit direction for the outer coating.

If an extruded profile is to be produced or if a pre-manufactured extruded profile shall simply be provided with a coating of the desired color pattern, a distributor plate is required, into which the distribution channels around the ring channel are integrated. The distribution channels and the ring channel are preferably formed as grooves in the distribution plate which are covered by a cover plate sitting on the distribution plate, whereby a ring opening remains in the area of the ring channel. The combined partial flows can either directly exit into the exit channel through this ring opening, whereby this ring opening is formed as a ring slot, or the partial flows are fed to a die part containing a die arbor through a ring slot extending in an axial direction. The cover plate can thus either form the end plate of the extruding head and have a central boring for the exit channel or the cover plate is formed as intermediate plate between the distribution plate and a die part. In the latter case, the cover plate preferably also includes the feeder channel which leads into the distribution channels.

The cover plate preferably has a central boring which, together with an insert projecting into the boring, delimits a first section of the ring slot. The insert can be a pipe-shaped projection of the distribution plate, which in turn, holds a guiding insert with a boring narrowing in the direction of the exit. A die part is connected to this cover plate in the direction of the exit, which, together with an arbor contained in the die part, delimits a second section of the ring slot. If a pre-manufactured extruded profile shall be coated, this die arbor possesses a central boring which is in alignment with the boring of the guiding insert.

The pre-manufactured extruded profile is inserted through this boring into the exit channel of the extruding head where the desired coating takes place.

If extrusion of the extruded profile is to be carried out in the extruding head instead of a coating, this above described die arbor can be exchanged with a die arbor without central boring.

In case the extruded profile and/or the coating of the extruded profile shall be provided with an additional coating, e.g. a thin outer coating, which shall also be of such a color pattern, the die part can also be equipped with distribution channels and a ring channel at its front side according to a further design, which are integrated into the die part as grooves. These grooves are then covered by the end plate of the extruding head, which has a central boring for the formation of the exit channel. This die part preferably also contains the feeder channel, which is connected with the distribution channels on one hand and to a plasticizing and conveyor device, such as e.g. an extruder on the other hand. These distribution channels, too, can be divided into further sub-distribution channels. The cover plate is designed to leave a ring slot between the inner rim of the ring channel and the end plate through which the plasticized, at least dual-colored material can enter the exit channel.

Due to the distribution channels and the ring channels being contained as grooves in the respective parts of the extruding head, which is advantageous from a production point of view, these channels possess a semi-circle cross section. The distribution channels are preferably of equal length. This results in an even distribution of the pattern over the entire circumference.

BRIEF DESCRIPTION OF THE DRAWINGS

Examples for the design of the invention are explained in more detail in the following with the help of the drawings.

DETAILED DESCRIPTION

Figure 1:
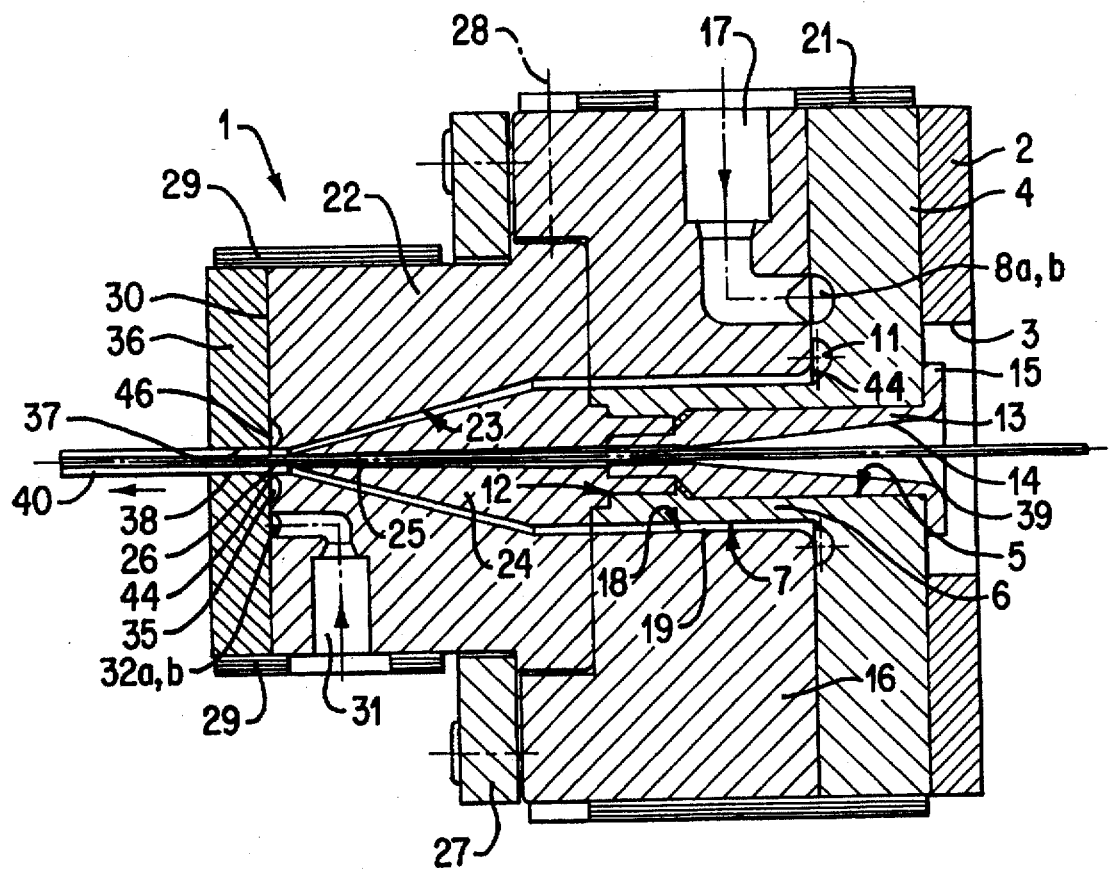
FIG. 1 shows a longitudinal section through the extruding head.

FIG. 1 shows the extruding head in a longitudinal section. This extruding head 1 is equipped with a distribution plate 4, which is delimited by a front plate 2 a cover plate 16 in an exit direction. The front plate 2 has a central boring 3 so that at least a pre-manufactured extruded profile 39 can be inserted in the extruding head 1. The distribution plate 4, too, has a central boring 5, which is continued in the pipe-shaped projection 6 of the distribution plate 4, in which a guiding insert 13 is installed. This guiding insert, which is mounted to the distribution plate 4 with its connection flange 15, has a boring 14 which narrows in the direction of the exit, so that the pre-manufactured extruded profile 39 can enter the extruding head 1 without being damaged.

The distribution channels 8a, 8b and sub-distribution channels 9a, 9b, 10a, 10b (see FIG. 2), as well as the ring channel 11 are formed as grooves in the front side of the distribution plate 4 at the exit side. These grooves are covered by the cover plate 16 which also contains the feeder channel 17, which leads into the distribution channels 8a, 8b, whereby a ring opening 44 remains in the area of the ring channel 11, through which the partial flows combined in the ring channel 11 can exit into the ring slot 19 which is delimited through the exterior surface 7 of the pipe-shaped projection 6 and the central boring 18 of the cover plate 16. The first section 19 of the ring slot leads into the second section of the ring slot 20, which is formed by the die part 22 and the arbor 24, which rests against the pipe-shaped projection 6 at the front side 12. The die part 22 has a cone-shaped interior surface 23, to which the shape of the die arbor 24 is matched. The die arbor 24 has a central boring 25, which is in alignment with the narrowing boring 14 of the guiding insert. The die arbor 34 is equipped with a cylindrical arbor extension 26, which projects into the exit channel 38. The exit channel 38 is formed through a corresponding boring in the die part 22 and the central boring 37 of the end plate 36.

The die part 22, which is mounted to the cover plate 16 with the supporting plate 27 and can be radially adjusted and fastened with the adjusting screws 28, is also equipped with distribution channels 32a, b, as well as sub-distribution channels 33a, b, 34a, b at its front side and a ring channel 35 in the form of grooves. The distribution channels 32a, b, are connected to the feeder channel 31 in the die part 22, which is connected to a further plasticizing and conveyor device (not shown). The end plate 36 is formed so that the distribution and sub-distribution channels 32a, b, 33a, b, 34a, b and the ring channel 35 are covered, whereby a ring opening 44 remains in the area of the ring channel 35, so that the fed plasticized material can enter from the ring channel 35 into the exit channel 38 and provides the coating formed through the die part 22. The extruding head 1 is equipped with heating bands 21 and 29, in order to keep the plasticized material at the temperature required for the extrusion process.

Figure 2:
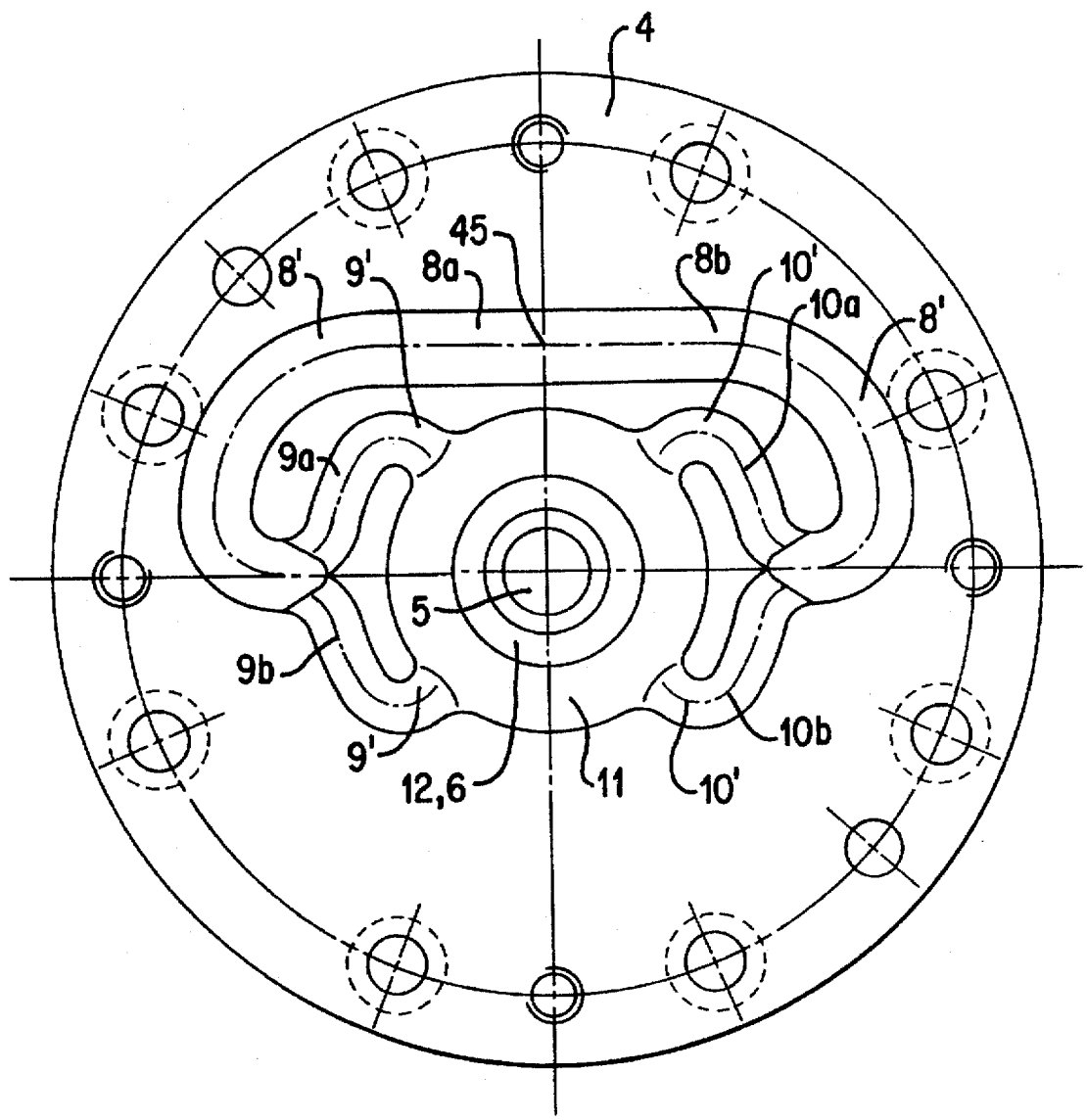
FIG. 2 shows the top view of a distribution plate.

FIG. 2 shows the top view of the distribution plate 4. The feeder channel 17 enters into the distribution channels 8a and 8b at the junction 45. The plasticized material supplied through the feeder channel is thus separated into two partial flows through deflection by 90° which flow to the ring channel 11 along the distribution channels 8a and 8b. In the shown design, the two distribution channels 8a and 8b are arranged so that they extend from the junction 45 to the outside in opposite directions. The distribution channels 8a and 8b are equipped with a curved section 8' at their ends, which radially leads towards the ring channel 11. This curved section 8' branches into two sub-distribution channels 9a and 9b or 10a and 10b, respectively. The cross section of these sub-distribution channels 9a, 9b, 10a, 10b is smaller than the cross section of distribution channels 8a and 8b. These sub-distribution channels, too, are equipped with a curved section 9', 10' at their ends, which radially enters into the ring channel 11. The sub-distribution channels possess the same cross-sections and are of the same lengths. The entrance points of the sub-distribution channels 9a, 9b, 10a, 10b into the ring channel 11 are installed at an equal distance along the circumference of ring channel 11, so that 2 of the sub-distribution channels 9a, 10b or 9b and 10a, respectively are located across from each other.

Figure 3:
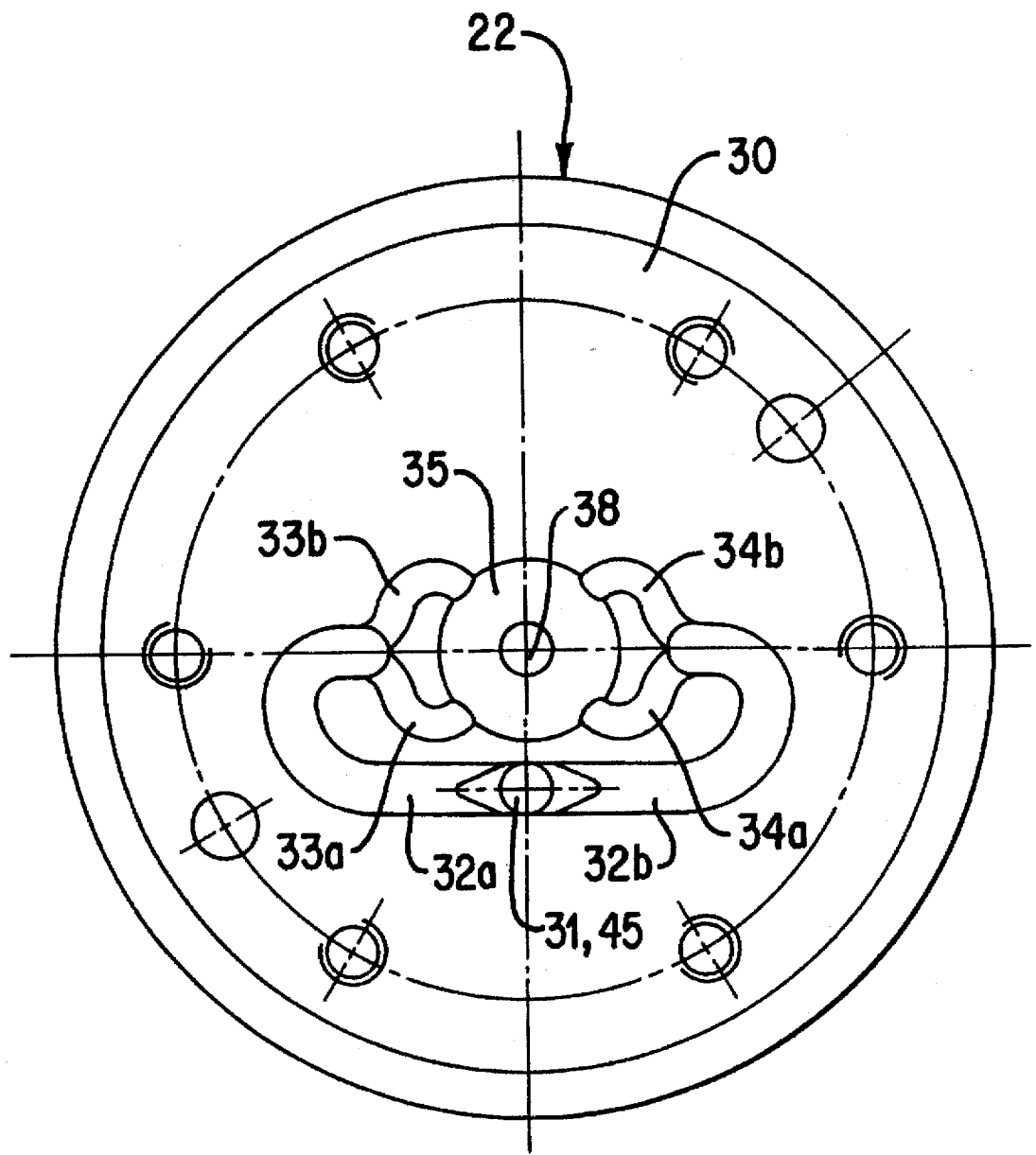
FIG. 3 shows the top view of the die part.

FIG. 3 shows the front view of die part 22. The feeder channel 31 leads into the two distribution channels 32a and 32b, which branch into sub-distribution channels 33a, 33b and 34a and 34b, respectively. These sub-distribution channels lead into the ring channel 35. The design of the distribution channels 32a, 32b and the sub-distribution channels 34a, 34b and 33a, 33b corresponds to the design of the distribution channels and sub-distribution channels of FIG. 2, so that reference can be made to the respective description.

Figure 4:
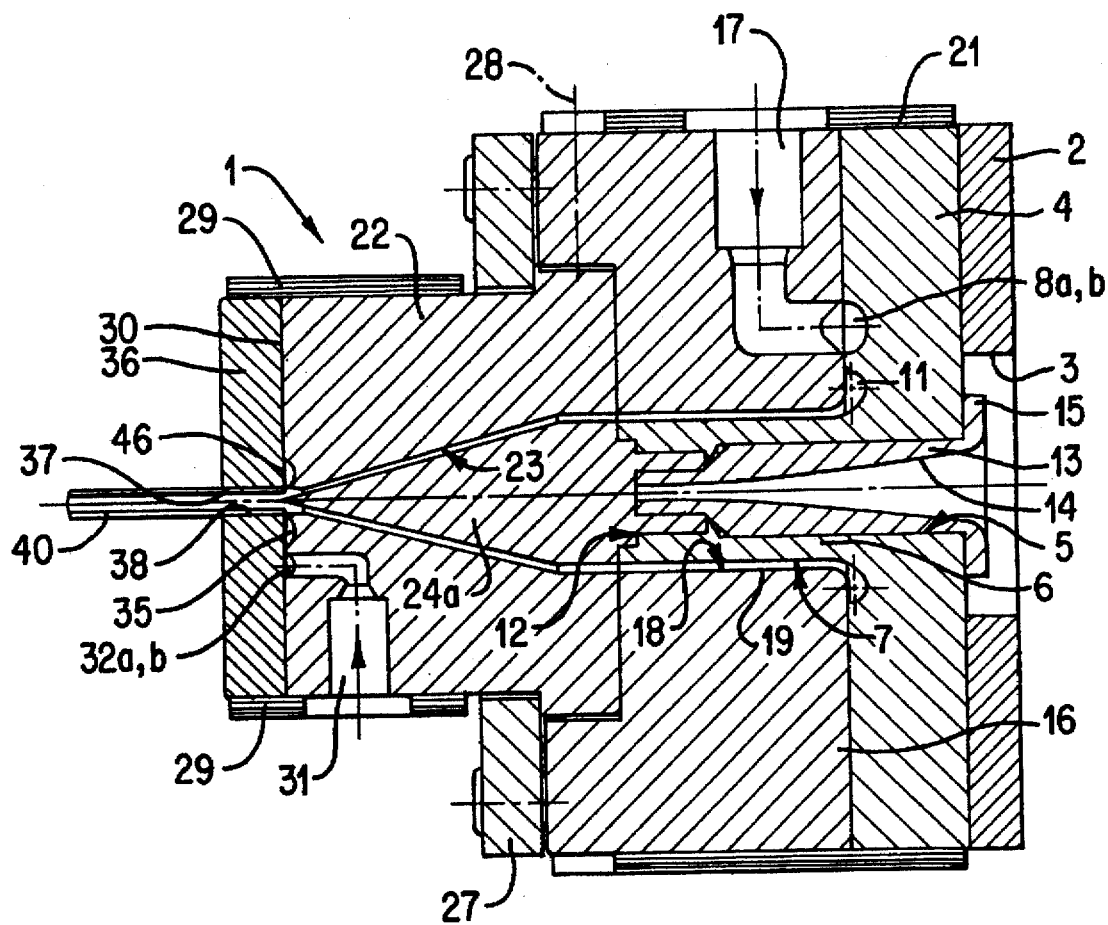
FIG. 4 shows a longitudinal section through the extruding head according to another design and FIG. 5 shows a sharpened pencil in perspective view.

FIG. 4 shows a further design of the extruding head 1 in a longitudinal section. This extruding head is designed for the manufacture of extruded profiles, which are coated with a thin exterior coating. The difference to the design of FIG. 1 consists of the die arbor 24 having been exchanged with a closed die arbor 24a.

Figure 5:
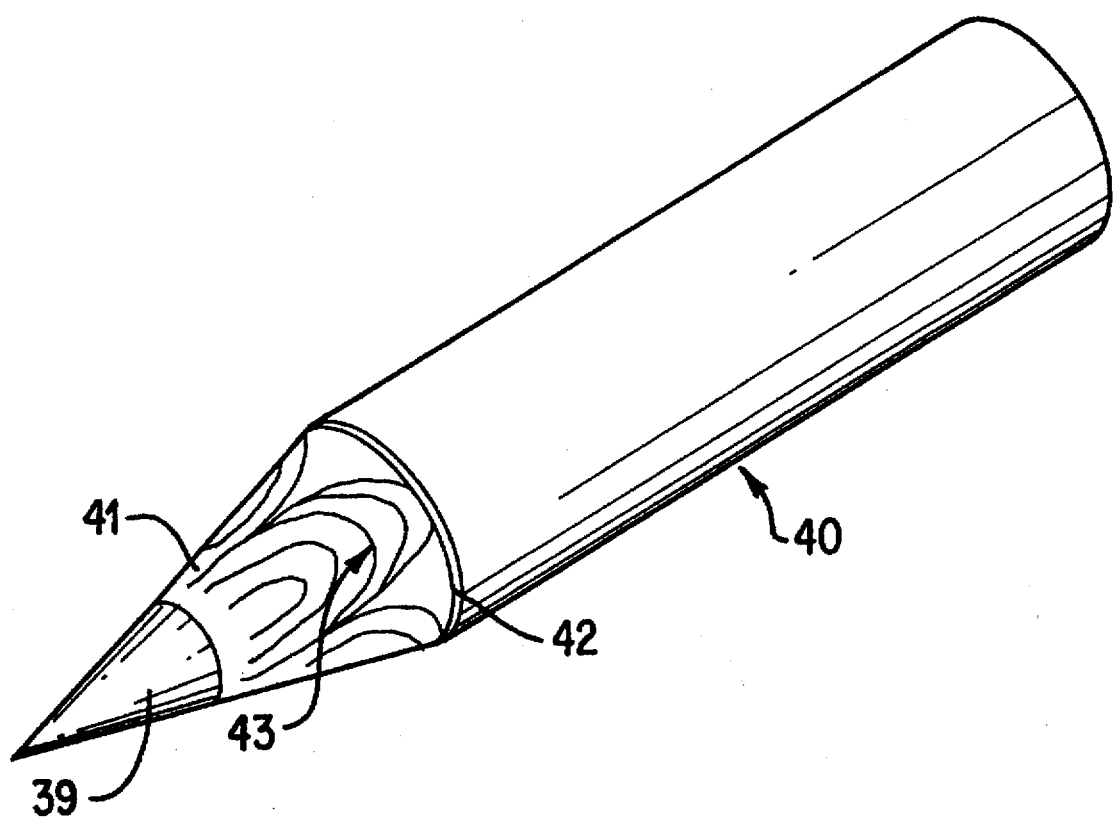

FIG. 5 shows a sharpened, coated extruded profile 40 in the perspective. This coated extruded profile 40 can be a pencil, for example. In this case the pre-manufactured extruded profile 39 represents the pencil lead and the coating 41 represents the coating of the pencil lead. A further exterior coating 42 was applied to the pencil lead coating 41. If a plasticized dual-color material is fed through the feeder channel 17 of the extruding head 1 shown in FIG. 1 for the coating 41, the coating 41 shows curved color patterns 43 after sharpening, which are similar to the wood grain of a pencil. The number of the curved patterns 43 correlates with the number of partial flows and therefore with the number of distribution channels and sub-distribution channels, respectively. Depending on the material used and the degree of the blending of the partial flows, these curved patterns 43 become more or less pronounced. In the case of low blending of the partial flows on the way to the exit opening of the extruding head 1, the number of curved patterns 43 corresponds to the number of partial flows.

List of Reference Symbols

1 Extruding head
2 Front plate
3 Central boring
4 Distribution plate
5 Central boring
6 Pipe-shaped projection
7 Exterior surface
8a,b Distribution channels
8' Curved section
9a,b Sub-distribution channel
9' Curved section
10a,b Sub-distribution channel
10' Curved section
11 Ring-channel
12 Front side
13 Guiding insert
14 Narrowing boring
15 Fastening flange
16 Cover plate
17 Feeder channel
18 Central boring
19 First section of the ring slot
20 Second section of the ring slot
21 Heating band
22 Die part
23 Interior surface
24,24a Die arbor
25 Central boring of the die arbor
26 Arbor extension
27 Supporting plate
28 Adjusting screws
29 Heating band
30 Front side
31 Second feeder channel
32a,b, Distribution channel
33a,b Sub-distribution channel
35 Ring channel
36 End plate
37 Central boring
38 Exit channel
39 Extruded profile
40 Coated extruded profile
41 Coating
42 Exterior coating
43 Curved color pattern
44 Ring opening
45 Junction
46 Ring slot

What is claimed is:

1. Process for the continuous manufacture and/or coating of extruded profiles, comprising feeding a plasticized material to an extruding head and extruding the plasticized material through the extruding head, wherein plasticized material of at least two colors is used, said plasticized material being separated into at least two partial flows wherein said two colors are not homogeneously mixed, and wherein the partial flows are combined again before exiting the extruding head, whereby the partial flows are maintained as much as possible.

2. Process according to claim 1, wherein at least one partial flow is divided into at least two additional partial flows.

3. Process according to claim 1, wherein the respective partial flows are of equal size.

4. Process according to claim 1, wherein the partial flows are combined in one direction vertical to the exit direction and subsequently jointly deflected in the direction of the exit.

5. Process according to claim 1, wherein the partial flows are combined in one ring chamber.

6. Extruding head for the manufacture and/or coating of extruded profiles comprising a feeder channel supplying plasticized material from a plasticizing and conveyor device and an exit channel connected to the feeder channel, wherein the feeder channel is connected to at least two distribution channels which enter into a ring channel at equidistant locations, whereby the ring channel is connected with the exit channel through a ring slot extending in an axial direction.

7. Extruding head according to claim 6, wherein the extruding head is equipped with at least two feeder channels, each of which is connected to one of said distribution channels.

8. Extruding head according to claim 6, wherein at least one of said distribution channels enters into at least two sub-distribution channels which are connected to the ring channel.

9. Extruding head according to claim 6, wherein the ring channel forms a collection channel.

10. Extruding head according to claim 9, wherein the distribution channels enter into the ring channel in a radial direction at equidistant locations.

11. Extruding head according to claim 8, wherein the distribution and sub-distribution channels all have the same cross-section.

12. Extruding head according to claim 6, wherein the ring channel is installed vertically to the longitudinal axis of the exit channel.

13. Extruding head according to claim 6, wherein the ring channel surrounds the exit channel.

14. Extruding head according to claim 6, wherein the distribution channels and the ring channel are formed as grooves in a distribution plate which is covered by a cover plate leaving a ring opening in the area of the ring channel.

15. Extruding head according to claim 14, wherein the cover plate forms an end plate of the extruding head and possesses a central boring for the exit channel.

16. Extruding head according to claim 14, wherein the feeder channel is integrated with the cover plate.

17. Extruding head according to claim 14, wherein the cover plate has a central boring, which, together with an insert projecting into the boring forms at least a first section of a ring slot.

18. Extruding head according to claim 17, wherein the insert is a pipe-shaped projection of the distribution plate, said projection holding a guiding insert with a boring that narrows in the direction of the exit, for the insertion of a pre-manufactured extruded profile.

19. Extruding head according to claim 18, wherein a die part connects to the cover plate in the direction of the exit, which, together with a die arbor installed in the die part delimit a second section of the ring slot.

20. Extruding head according to claim 19, wherein the die arbor possesses a central boring which is aligned with the boring of the guiding insert.

21. Extruding head according to claim 19, wherein the front side of the die part pointing to the exit direction is equipped with the distribution channels and the ring channel, whereby the distribution channels are connected to a second feeder channel and the ring channel is connected to the exit channel through a ring slot.

22. Extruding head according to claim 8, wherein the distribution channels and the sub-distribution channels, as well as the ring channel have a cross-section in the shape of a semi-circle.

23. Extruding head according to claim 8, wherein the distribution channels that correspond to each other and/or the sub-distribution channels are of the same length.

24. Extruding head according to claim 6, further comprising a die part to shape plasticized material exiting from the extruding head.

25. Extruding head according to claim 24, wherein the plasiticized material comprises a single material of at least two different colors, the plasticized material being separated into two flows of different colors with the distribution channels, whereby an extruded profile is formed with the plasticized material which has predetermined pattern comprised of the at least two different colors.

26. An extruding head comprising:
    a feeder channel for receiving a plasticized material of at least two different colors;
    at least two distribution channels connected to the feeder channel wherein the plasticized material is separated into a first flow and a second flow, the material comprising the first flow having a different color than the material comprising the second flow;
    a ring channel connected to the distribution channel, the ring channel recombining the first flow and the second flow without homogeneously mixing the first flow and the second flow; and
    a die part defining an exit channel through which the recombined material is shaped into an extruded material having a predetermined pattern comprising the at least two different colors.

* * * * *